United States Patent [19]

Simmons et al.

[11] Patent Number: 4,616,050

[45] Date of Patent: Oct. 7, 1986

[54] FILLER-CONTAINING HARDENABLE RESIN PRODUCTS

[76] Inventors: Walter J. Simmons, Rt. 2, Box 234, Martinsburg, W. Va. 25401; Frank M. Willis, 102 Lenape Tr., Wenonah, N.J. 08090

[21] Appl. No.: 720,026

[22] Filed: Apr. 9, 1985

Related U.S. Application Data

[63] Continuation-in-part of Ser. No. 615,855, May 31, 1984, abandoned.

[51] Int. Cl.⁴ ............................ C08K 7/00; C08K 3/34
[52] U.S. Cl. ................................. 523/220; 523/513; 405/260; 405/261
[58] Field of Search ............... 523/220, 513; 405/260, 405/261

[56] References Cited

U.S. PATENT DOCUMENTS

| | | | |
|---|---|---|---|
| 3,303,245 | 2/1967 | Trudeau | 523/220 |
| 3,371,791 | 5/1968 | Fourcade et al. | 206/47 A |
| 3,714,113 | 1/1973 | Kingston | 523/220 |
| 4,007,831 | 2/1977 | Bernhardt | 405/261 |
| 4,113,501 | 9/1978 | Edamoto | 523/220 |
| 4,280,943 | 7/1981 | Bivens et al. | 260/29.2 E |
| 4,393,638 | 7/1983 | Sell et al. | 405/261 |
| 4,518,283 | 5/1985 | Gebauer et al. | 405/260 |

FOREIGN PATENT DOCUMENTS 3033801  4/1982  Fed. Rep. of Germany.

*Primary Examiner*—Lewis T. Jacobs

[57] ABSTRACT

A coarse/fine particulate inert solid filler component, e.g., limestone and/or sand, is used in a hardenable resin composition adapted for use in making set products, e.g., a hardened grout for anchoring a reinforcing member in a hole. About from 5 to 50 percent by weight of the filler is a coarse filler component comprised of particles in a size range whose minimum is about 1 mm, or a size range which is from 30 to 150 percent of the thickness of the annular layer of hardened grout formed around a reinforcing member. The thus-filled resin composition is readily miscible and flowable even at total filler levels as high as about 88 percent by weight. Rock bolt grouting products containing this resin composition require less bolt spinning and afford improved anchorage strength, even when used to point anchor mechanical expansion shells.

31 Claims, No Drawings

FILLER-CONTAINING HARDENABLE RESIN PRODUCTS

CROSS-REFERENCE TO RELATED APPLICATION

This application is a continuation-in-part of co-pending application Ser. No. 615,855, filed May 31, 1984, now abandoned.

BACKGROUND OF THE INVENTION

1. Field of the Invention

The present invention relates to filled hardenable resin compositions, and more particularly to hardenable, or setting, two-component resin products containing such compositions for use in systems wherein a filler-containing resin component and a catalyst component are maintained separate from one another until the time of use, and then mixed together to allow ingredients therein to react and form a hardened product, e.g., a grout around a reinforcing member in a hole in a mine roof.

2. Description of the Prior Art

Anchor bolts are employed in various fields of engineering, for example, as strengthening or reinforcing members in rock formations and in structural bodies. The bolts are inserted into drill holes in the formation or body, and often are fixed or anchored therein, at their inner end or over substantially their entire length, by means of a reactive grouting product which hardens around the bolt. When used in a mine roof, bolts grouted in this manner help significantly to prevent mine roof failure. The higher the anchorage strength (dependent on the strength of the grout interface with the bolt and with the wall of the hole), the more reliable the roof support system.

Two-component reactive grouting products which have been used in rock bolt anchoring include those based on hardenable synthetic resins, and these have been introduced into the drill holes through a feed pipe, or in cartridged form. Although the reactive ingredients of the product can be delivered into the hole in combined and mixed form either before or after bolt insertion, usually they have been delivered separately into the hole, e.g., in compartmented cartridges, and combined therein and mixed, e.g., by inserting the bolt into the cartridges and rotating it.

A hardenable synthetic resin composition that has gained wide acceptance as a component of bolt-anchoring grouting products is a composition containing an unsaturated polymerizable polyester resin and a monomeric polymerizable ethylenic crosslinking agent therefor. These materials, together with a polymerization inhibitor or stabilizer, and a promoter for a peroxide catalyst, constitute a resin formulation contained in a first grout component (R). A peroxide catalyst system for initiating the crosslinking polymerization is contained in a second grout component (C), kept separated from component R until the hardening reaction is to take place. When components R and C are combined and mixed, the action of the catalyst causes the crosslinking reaction between the polyester and ethylenic monomer to take place, resulting in a thermoset, hard resin.

Particulate inert fillers or aggregates are nearly always added to the resin component of resin grouting products. Fillers have been reported (e.g., in U.S. Pat. No. 3,731,791, Fourcade et al.) to reduce the shrinkage of the resinous mass which occurs during polymerization, and they also reduce the cost of the product because they replace a portion of the more-expensive resin composition. A variety of materials have been disclosed as fillers, e.g., in U.S. Pat. No. 4,280,943 (Bivens et al.), the disclosure of which is incorporated herein by reference. U.S. Pat. No. 3,371,791 reports that, in order to ensure filler loadings in the 70–80 percent range while retaining adequate fluidity in resin-based compositions, the filler particle size distribution should be from 150 mesh to 300 mesh (0.05 mm to 0.1 mm).

German Offenlegungsschrift No. DE 3033801 A1 describes the use of filler-containing set resin compositions to form shaped articles of various kinds. A high-viscosity unsaturated polyester resin solution, in mixture with a peroxide catalyst and a promoter, and optionally some 0.001–0.5 mm filler, is co-extruded with 0.2–3 mm sand into a mold, where hardening takes place to form the shaped articles.

SUMMARY OF THE INVENTION

The present invention provides a filled resin composition of improved flowability and miscibility characteristics and adapted to harden on mixing with a catalyst, said resin composition containing about from 78 to 88 percent by weight of a particulate inert solid filler, e.g., limestone and/or sand, consisting of about from 5 to 50, and preferably about from 10 to 40, percent by weight of a coarse filler component comprised of particles in a size range whose minimum is about 1 mm, and whose maximum preferably is about 12.5 mm, and the remainder a fine filler component comprised of particles whose maximum size is below 1 mm. In a preferred composition the resin is an unsaturated polymerizable polyester resin which is mixed with a monomeric polymerizable ethylenic crosslinking therefor, and a polymerization inhibitor and a promoter for a peroxide catalyst may be present.

The presence of the coarse filler component in the composition results in a workable viscosity at high total filler concentrations and better miscibility, requiring less strenuous mixing conditions when the resin composition is to be blended with a catalyst.

The present invention also provides a hardenable two-component resin product containing separate resin and catalyst components, the resin component comprising the filled resin composition of the invention. A preferred two-component product of the invention is a grouting product adapted to be placed with its two grout components in a separated condition in a hole in a structure to be reinforced, and to have a reinforcing member inserted and rotated therein so as to mix the components and allow ingredients therein to react and produce an annular layer of hardened grout that bonds the reinforcing member to the hole wall. In the grouting product of the invention, the coarse filler component in the resin component is comprised of particles in a size range which is from 30 to 150, amd preferably from 40 to 60, percent of the thickness of the annular layer of grout, and the fine filler component is comprised of particles in a size range whose maximum is below 30 percent of the thickness of the annular layer. The catalyst component contains 0 to about 88 percent by weight of a particulate inert solid filler consisting of 0 to about 50 percent by weight of the coarse filler component, and the remainder the fine filler component, the content of particles larger than 100 percent of the thickness of the annular layer in all coarse filler components being in the range of 0 to about 10 percent of that component by weight.

The most commonly used rock bolt and hole diameters provide an annulus of about from 3.2 to 6.4 mm. Therefore, while slight variations in intended hole diameters occur owing to limitations in the degree of precision attainable with available drilling equipment, in preferred grouting products of the invention, the coarse filler component is in the particle size range of about from 1.0 mm to 9.6 mm, the range of about from 1.0 to 4.8 mm (with a maximum of 10 percent thereof being larger than about 3.2 mm) being adapted for use with an approximately 3.2-mm annulus, and about from 2.0 to 9.6 mm (with a maximum of 10 percent thereof being larger than about 6.4 mm) for use with an approximately 6.4-mm annulus.

The presence of larger amounts of filler in the resin component of grouting products of the invention, and in the total product, does not deleteriously affect the pre-setting workability of the product (e.g., ease of bolt insertion and rotation therein in bolt-anchoring grouts), and the anchorage strength of hardened grouts is improved.

The resin component of two-component products is the major component, and this contains the specified coarse/fine filler. In most instances the weight ratio of resin to catalyst component will be quite high, e.g., about 2.0 and possibly higher than 10, so that the improvement will be obtained with the coarse/fine filler in the resin formulation alone, even if the catalyst formulation contains fine filler. However, unless the catalyst component also contains coarse filler, at least about 50 percent by weight of the total amount of filler present in the product preferably will be present in the resin component.

DETAILED DESCRIPTION

One of the findings upon which the present invention is based is that better anchorage strength is achieved with grouted rock bolts when the inert particulate solid filler used in at least the major, i.e., the resin, component of the grouting product contains up to about 50 percent of a coarse component in which the particles can approach, and a small proportion thereof even exceed, the size of the annulus between the rock bolt and the hole wall (i.e., the thickness of the annular layer of grout that bonds the bolt to the surrounding formation). Surprisingly, the presence of this coarse component, in properly controlled amounts, affords a readily workable grout (i.e., one in which bolt insertion and rotation present no difficulty) at total filler levels which have proved difficult to work in the case of previously known compositions. Replacing a certain portion (up to about 50 percent) of a fine filler with coarse filler specifically as defined herein has been found to produce a grouting composition of sufficiently low viscosity as to enable a bolt to be inserted and rotated therein without difficulty at total filler levels at which previously known compositions have been so viscous as to make bolt insertion and rotation difficult. In order for this beneficial effect to be achieved, it is important that the fine-by-coarse replacement be only partial, a 100% replacement producing an unworkable composition even at relatively low total filler levels.

Regarding the improved anchorage strength obtained with the present grouting compositions, this improvement may be attributable to the nature of the coarse filler per se, or the higher total filler content of the major grout component, or a combination of both effects. The coarse filler particles may be half the size of the annular grout layer or more, and there is evidence that such coarse filler particles, if at least as hard as the wall of the hole, cause scoring or grooving of the wall surface, which may result in a better locking of the grout with the wall.

The beneficial effect of the coarse/fine filler with respect to the achievement of a workable viscosity at high filler concentrations, described above chiefly with respect to grouting products, is useful in hardenable filled resin compositions destined to be mixed with a catalyst for the formation of other setting products, e.g., in those which harden in a mold to form shaped articles. Here, improved processibility results because of the lower viscosity at high filler levels.

Another beneficial effect, useful in grouting as well as non-grouting products of the invention, is an improvement in the miscibility of the product's resin component (and the catalyst component if it contains a coarse/fine filler) believed to be caused by the action of the coarse filler particles as individual mixing implements when the components are in flow. This is advantageous in the blending of the initially separated reactive components, e.g., a filled resin and a catalyst. The mixing effect of the coarse particles can be demonstrated by a test in which a force is placed on "streams" of the two components in side-by-side contact, but not mixed, with each other. This situation occurs when in a pipe or borehole the two side-by-side components (positioned as they are in a chub cartridge) have a reinforcing element (e.g., a bolt) thrust into them with no spinning. The amout of mixing achieved in this situation (when the resin is an unsaturated polyester resin) can be estimated by removing all of the grouting product from the borehole and washing it with acetone to determine how much of the product had reacted (dissolved material being unreacted) as a result of the bolt insertion. It has been found that as the coarse component content of the filler in the two-component grouting product increases from about 5 percent to 50 percent, the amount of undissolved material, and therefore the degree of mixing caused by the coarse filler, increases from 39 percent to 77 percent. Thus, with this product a minimum amount of bolt-rotating time is required.

The product of the invention also has the advantage of being uniquely adapted for use in point-anchoring grouting systems wherein the expansion shell of a mechanical bolt is anchored to the hole wall with the resin/catalyst product. When an expansion shell was anchored with the present product containing a 3.18-mm coarse filler component, the coarse particles appeared to wedge between the hole wall and the expanding shell. Thus the particles are actually forced into the wall, greatly improving the friction between the shell and the wall. The present product increased the anchorage strength of a mechanical anchor from 21,000 to 36,000 Newtons, whereas a resin grout containing all fine filler actually reduced the strength to 17,000 Newtons, apparently having acted as a lubricant for the metal shell.

The invention will now be described by means of the following illustrative examples, in which parts and percentages are by weight.

EXAMPLE 1

A composition having a resin component (R) and a catalyst component (C) in a 70/30 percentage ratio was prepared. The resin component was a mixture of 21% of a resin formulation and 79% filler. The base resin formulation consisted approximately of 64.0% of a polyester resin, 17.1% styrene, 14.2% vinyl toluene, 1.9% fumed silica, and 2.9% stabilizers and promoters. The polyester resin was the esterification product of maleic anhydride, propylene glycol, and diethylene glycol, the maleic anhydride having been partially replaced with phthalic anhydride (30% maleic anhydride, 23% phthalic anhydride, 17% propylene glycol, and 30% diethylene glycol). The formulation was described by the supplier as "One Minute Resin", denoting the presence of sufficient promoter to produce a gel time of one minute when the resin formulation is mixed with a benzoyl peroxide catalyst.

The catalyst component was a mixture of 72.5% limestone, 19.1% water, 0.4% of methylcellulose, and 8.0% of a benzoyl peroxide (BPO) catalyst paste sold by Witco Chemical Company, Inc. and consisting, approximately, of 49.3% BPO, 24.7% butyl phenyl phthalate, 14.8% water, 7.9% polyalkylene glycol ether, 2.0% zinc stearate, and 1.3% fumed silica.

Two different resin components according to the invention were prepared. One, used in Product I, contained coarse and fine limestone components as the filler; the other, used in Product II, contained coarse sand and a combination of fine sand and limestone as the filler. Products III and IV, made with a filler in the resin component that was 100% fine limestone, were control products.

In Product I, the filler in the resin component was provided by a combination of 38% of a first grade of limestone (Grade A), and 62% of a second grade of limestone (Grade B). In Grade A, 33% of the particles averaged larger than 1.19 mm (with 10% of these larger than 2.3 mm, 3% larger than 4.76 mm, and none larger than 9.53 mm). This portion constituted the coarse component of the filler in the resin component, i.e., 12.5% of the total filler therein. In the Grade A limestone, an average of 42% of the particles were smaller than 0.59 mm (with 17% smaller than 0.297 mm, and 5% smaller than 0.149 mm), and this portion, together with the Grade B limestone, constituted the fine filler component. An average of 99.8% of the Grade B limestone particles were smaller than 0.84 mm, with 98.7% smaller than 0.297 mm, 97.9% smaller than 0.250 mm, 91.5% smaller than 0.149 mm, and 69.6% smaller than 0.074 mm.

The limestone in the catalyst component was all of the Grade B type just described.

Product II was like Product I except that the filler in the resin component consisted of 38% sand and 62% of the Grade B limestone used in Product I. In the sand, 83.9% of the particles averaged larger than 1.00 mm (with 59.6% of these larger than 1.19 mm). This constituted the coarse component of the filler in the resin component, i.e., 31.9% of the total filler therein. In the sand, 6.6% of the particles averaged smaller than 0.84 mm (with 1.9% smaller than 0.59 mm, 0.8% smaller than 0.42 mm, and 0.2 smaller than 0.297 mm), and this portion, together with the Grade B limestone used in Product I, constituted the fine filler component.

Product III, a control product, was the same as Products I and II except that all of the filler in the resin component was the Grade B limestone described above. Product IV was the same as Product III except that the resin component was a mixture of 24% of the resin formulation and 76% of the same Grade B limestone filler.

The interfacial strength developed when the components of the products were combined and mixed in a simulated drill hole was evaluated as follows:

Component R was introduced into one compartment, and component C into the other compartment, of a two-compartment frangible "chub" cartridge such as that described in U.S. Pat. Nos. 3,795,081 and 3,861,522, the cartridge being made of polyethylene terephthalate film. In the sealed compartmented cartridge, which was 43-centimeters-long and 2.3 centimeters in diameter, the two components were maintained separate from one another in their 70/30 R/C weight ratio. The cartridge was inserted into a 61-cm.-long, 2.54-cm.-inner-diameter, oiled smooth-wall steel pipe (simulated borehole). A 61-cm.-long, 1.9-cm.-diameter reinforcing rod (bolt) was inserted into the cartridge at a speed of 7.5 meters per minute at 250 rpm. The pipe, bolt, and cartridge were at about 10° C. During insertion the bolt broke the polyethylene terephthalate film, and mixed the components together. Total mix time was 15 seconds. The resin gelled in about 1 minute, after which the pipe assembly was sawed into 2.54-cm.-long pieces starting 15.2 cm. from the innermost end. After the specimens had returned to room temperature (having become heated in the sawing operation), the force required to push the hardened grouting composition, and the bolt section embedded therein, out of the 2.54-cm. pipe sections was measured.

Four cartridge samples were used for each product, and the results averaged. Since the boreholes were relatively consistent in finish, any differences in push-out force is believed to have been indicative of the strength of the grout/borehole interface. The results were as follows:

| Test No. | Product No. | Average Push-Out Force (Newtons) |
| --- | --- | --- |
| 1 | I | 9287 |
| 2 | I | 8896 |
| 3 | II | 16680 |
| 4 | II | 15346 |
| 5 | III* | 5782 |
| 6 | III* | 2469 |
| 7 | IV* | 6672 |

*Control

The above results show that much greater force was required to push out the samples of Products I and II, which contained coarse filler according to the invention, in contrast to the control products, which contained only fine filler. Of the two products of the invention tested, the product containing coarse sand gave the better results in the smooth oily steel borehole, which may be an indication of the benefit of the greater amount of grooving and scoring of this type of steel surface that occurs with the harder filler material. Products I and II also were more consistent in the average push-out force measured in the two tests, in contrast to the control Product III.

Although no difficulty was experienced in inserting the bolt into the Product I and II cartridges (in which the resin component contained 79% filler, some of which was coarse) and the control Product IV cartridges (in which the resin component contained 76% filler, all of it fine), insertion of a bolt into the control Product III cartridges (79% all-fine filler in the resin component) was difficult. Thus, the present grouting product not only develops a greater interfacial strength, but accomplishes this at higher filler levels (i.e., lower resin levels) than could be used in previous products).

EXAMPLE 2

Two products of the invention, i.e., Products V and VI, and a control product, i.e., Product VII, were prepared as described in Example 1 with the following exceptions:

(a) Product V—The resin component was a mixture of 20% of the resin formulation and 80% of the filler. The resin formulation consisted approximately of 66% of a polyester resin, 28% styrene, 1% fumed silica, and 5% stabilizers and promoters. The polyester resin was the esterification product of maleic anhydride and propylene glycol, the maleic anhydride having been partially replaced by phthalic anhydride. The limestone in the resin component consisted of 37.5% of the Grade A limestone used in Product I, and 62.5% of the Grade B limestone used in all of the previous products. The coarse component amounted to 12.4% of the total filler in the resin component.

(b) Product VI—This product was the same as Product V except that the filler consisted of 62.5% of the described Grade B limestone and 37.5% of a coarse sand. In the latter, the minimum dimension of all of the particles was such that they all passed through a 3.18-mm screen and were held on a 1.59-mm screen. Thus, the coarse component of this filler amounted to 37.5% of the total filler.

(c) Product VII (control)—This product was the same as control Products III and IV of Example 1, except that the resin component was a mixture of 25% of the resin formulation used in Products V and VI, and 75% of the same Grade B limestone used in all of the previous products.

Products V and VI, and control Product VII, were cartridged as described in Example 1 and tested for pull strength in a limestone block. In this test the cartridge was placed in a 20.3-cm-long, 2.5-cm-diameter, slightly dirty hole in a limestone block. The cartridge, which was 20 cm long and 2.3 cm in diameter, was broken, and the components were mixed, by the penetration and rotation therein of a 33-cm-long, 1.9-cm-diameter headed steel reinforcing rod. The rotation speed was about 300 rpm, and mixing time 5 seconds. A pull force was applied to the rod in ten minutes (after mixing was initiated).

The axial displacement of the rod at a 71 kN load was 0.391 cm for Product V (average of six pulls), 0.508 cm for Product VI (average of three pulls), and 1.397 cm for control Product VII (average of four pulls). The maximum pull strength (the load at which the rod pulled out completely) was 110 kN for Product V, 86 kN for Product VI, and 73 kN for control Product VII.

When a product having a 100% coarse filler in its resin component, e.g., Product VI above with all of the Grade B limestone in the resin component replaced by the coarse sand used in Product VI, the product is so viscous that a reinforcing rod cannot be inserted into the cartridge.

EXAMPLE 3

Component R of Example 1 was used in a 92/8 percentage ratio with the following component C: 44.7% of the BPO catalyst paste described in Example 1, 27.6% "Cereclor" (a chlorinated oil containing 52% chlorine), 27.1% marble dust, and 0.6% fumed silica. The catalyst component contained no added water, i.e., none in addition to that which was present in the BPO catalyst paste.

Three 92/8 R/C products of the invention, and a control product, were made with this component C and the resin component of Example 1 comprising a mixture of 20% of the resin formulation described therein and 80% filler (except that the resin/filler percentage ratio was 25/75 for the control product).

Product VIII—In this product the filler in the resin component consisted of 37.5% of the Grade A, and 62.5% of the Grade B, limestone used in Product V (12.4% of the filler was coarse component).

Product IX—This product was the same as Product VIII except that, in the Grade A limestone used, 67.8% of the particles were larger than 1.19 mm (with 21.8% larger than 2.00 mm, 0.7% larger than 2.3 mm, and 0.1% larger than 3.36 mm), and 7.7% were smaller than 0.84 mm (with 1.5% smaller than 0.59 mm). Thus, the coarse component amounted to 25.4% of the total filler in the resin component.

Product X—This product was the same as Product VIII except that the Grade A limestone was replaced by the sand used in Product II, producing a coarse component that constituted 31.5% of the total filler in the resin component.

Product XI (control)—This product was the same as control Products III and IV except that the resin component contained 25% of the resin formulation and 75% of the Grade B limestone.

The cartridged products were pull-tested as described in Example 2 (except in clean holes), with the following results:

| Product No. | Displacement at 71 kN (cm) | Max. Pull Strength (kN) |
|---|---|---|
| VIII | 0.381 | 130 |
| IX | 0.432 | 100 |
| X | 0.305 | 111 |
| XI* | 0.940 | 73 |

*Control

As is shown by the above examples, the benefits of the defined coarse component in a filler in organic grouting products are achieved when this component is present only in the filler in the resin component. The catalyst component may contain no filler or an all-fine filler. Although the benefits of the coarse component are obtained when the catalyst component also contains the coarse/fine filler, generally it will be preferred that any filler present in the catalyst component will be of the all-fine type as defined herein, inasmuch as the redesign of manufacturing and/or packaging equipment that may be required to incorporate the coarse component in the smaller catalyst formulation can thereby be avoided.

In most instances, the grouting product of the invention will be packaged in film cartridges, preferably containing a loose or sealed flap of film that separates the two grout components. Such cartridges are described, for example, in U.S. Pat. Nos. 3,795,081 and 3,918,235. In use, the cartridge is broken by the insertion of the bolt, and the components mixed by bolt rotation. The latter action also is required to shred the film to a sufficient degree that the reaction between the ingredients in the product and interfacial strength (of the grout to the bolt and the hole wall) are not impaired. As is shown by the following test, the grouting product of this invention promotes better film shredding than products of the prior art which contain an all-fine filler as defined herein.

CARTRIDGE FILM SHREDDING TESTS

The products compared were the resin component of Product V (Example 2) made with the resin formulation described in Example 1, and the resin component of control Product IV (Example 1).

The resin component was loaded into the 44.5-cm-long, 2.3-cm-diameter "chub" cartridge described in Example 1. The film was 0.0036-cm thick. The catalyst component was omitted. The cartridge was placed into a 61-cm-long smooth steel pipe 2.54 cm in diameter. A 1.9-cm-diameter headed bolt was pushed into the cartridge and rotated for 10 seconds at 250 rpm.

The bolt was then removed, and all of the resin formulation and film was collected. The film was separated from the resin by washing it through a 3.175-mm screen. The film was removed from the screen, and the number of pieces were counted. Since the amount of film in the cartridge was equal in all tests, more pieces indicated better shredding. The results were as follows:

|     | Resin Component    |                                              | No. of Pieces of Film |
| --- | ------------------ | -------------------------------------------- | --------------------- |
| (A) | 20% resin 80% filler | (12.5% coarse component: 77.5% fine component) | (1) 220 |
|     | 20% resin 80% filler | (12.5% coarse component: 77.5% fine component) | (2) 233 |
| (B) | 24% resin 76% filler | (all fine component)                         | (1) 72 |
|     | 24% resin 76% filler | (all fine component)                         | (2) 79 |

Any particulate material that is substantially inert toward the materials in the component in which it is to be incorporated can be used as the filler. Limestone and sand are preferred fillers. Other materials can be used, however, including particles of competent rocks or rock-forming minerals such as calcite, granite, basalt, dolomite, andesite, feldspars, amphiboles, pyroxenes, olivine, iron oxides, gabbro, rhyolite, syenite, diorite, dolerite, peridotite, trachyte, obsidian, quartz, etc., as well as materials such as vitrified clay, slag, cinders, fly ash, glass cullet, and chopped metal (preferably steel) wire. Mixtures of different fillers also can be used.

We claim:

1. A filled resin composition of improved flowability and miscibility characteristics and adapted to harden on mixing with a catalyst, said resin composition containing (a) an unsaturated polymerizable polyester resin mixed with a monomeric polymerizable ethylenic crosslinking agent therefor and (b) about from 78 to 88 percent by weight of a particulate solid filler consisting of about from 5 to 50 percent by weight of a coarse filler component comprised of particles in the size range of from 1 to 12.5 mm, and the remainder a fine filler component comprised of particles in a size range whose maximum is below 1 mm.

2. A resin composition of claim 1 containing a polymerization inhibitor, and a promoter for a peroxide catalyst.

3. A resin composition of claim 1 wherein all of the filler therein is limestone, sand, or a combination of limestone and sand.

4. A hardened product formed by mixing the filled resin composition of claim 1 with a peroxide catalyst.

5. A hardenable two-component resin product containing separate resin and catalyst components, said resin component (R) comprising a filled resin composition containing (a) an unsaturated polymerizable polyester resin mixed with a monomeric polymerizable ethylenic crosslinking agent therefor and (b) about from 78 to 88 percent by weight of a particulate inert solid filler consisting of about from 5 to 50 percent by weight of a coarse filler component comprised of particles in the size range of from 1 to 12.5 mm, and the remainder a fine filler component comprised of particles in a size range whose maximum is below 1 mm.

6. A resin product of claim 5 wherein said catalyst component (C) contains 0 to 88 percent by weight of a particulate inert solid filler consisting of 0 to about 50 percent by weight of said coarse filler component, and the remainder of said fine filler component.

7. A resin product of claim 6 wherein said resin composition contains a polymerization inhibitor and a promoter for a peroxide catalyst, and said catalyst component contains a peroxide, the R/C weight ratio being at least about 1.5.

8. A resin product of claim 6 wherein all of the filler in said resin and catalyst components is limestone, sand, or a combination of limestone and sand.

9. A hardened product formed by mixing the resin and catalyst components of the product of claim 6.

10. In a two-component reactive grouting product comprising a filler-containing hardenable resin composition in one of said components and a catalyst composition in the other, said product being adapted to be placed with its two grout components in a separated condition in a hole in a structure to be reinforced, and to have a reinforcing member inserted and rotated therein so as to mix said components and allow ingredients therein to react and produce an annular layer of hardened resin grout that bonds said reinforcing member to the hole wall, the improvement comprising (a) in said resin-containing grout component, about from 78 to 88 percent by weight of a particulate inert solid filler consisting of about from 5 to 50 percent by weight of a coarse filler component comprised of particles in a size range which is from 30 to 150 percent of the thickness of said annular layer, and the remainder of a fine filler component comprised of particles in a size range whose maximum is below 30 percent of the thickness of said annular layer; and (b) in said catalyst-containing grout component, 0 to about 88 percent by weight of a particulate inert solid filler consisting of 0 to about 50 percent by weight of said coarse filler component, and the remainder of said fine filler component; the content of particles larger than 100 percent of the thickness of said annular layer in all coarse filler components in said product being in the range of 0 to about 10 percent of that component by weight.

11. A grouting product of claim 10 wherein said coarse filler particles are at least as hard as the material to which said reinforcing member is to be bonded.

12. A grouting product of claim 10 wherein all of the filler in said resin-containing and catalyst-containing components is limestone, sand, or a combination of limestone and sand.

13. A grouting product of claim 10 wherein all of the filler in said resin-containing and catalyst-containing components consists of limestone.

14. A grouting product of claim 10 wherein all of the coarse component in said product is sand.

15. A grouting product of claim 10 wherein said hardenable resin composition is a resin formulation (R) comprising an unsaturated polymerizable polyester resin mixed with a monomeric polymerizable ethylenic crosslinking agent therefor, a polymerization inhibitor, and a promoter for a peroxide catalyst, and said catalyst composition is a catalyst formulation (C) containing a peroxide, the R/C weight ratio being at least about 1.5.

16. In a two-component reactive grouting product comprising a filler-containing hardenable resin composition in one of said components and a catalyst composition in the other, said product being adapted to be placed with its two grout components in a separated condition in a hole in a structure to be reinforced, and to have a reinforcing member inserted and rotated therein so as to mix said components and allow ingredients therein to react and produce an annular layer of hardened resin grout that bonds said reinforcing member to the hole wall, the improvement comprising
 (a) in said resin-containing grout component, about from 78 to 88 percent by weight of a particulate inert solid filler consisting of about from 5 to 50 percent by weight of a coarse filler component comprised of particles in the size range of about from 1.0 to 4.8 mm, and the remainder of a fine filler component comprised of particles in a size range whose maximum is below about 1.0 mm; and
 (b) in said catalyst-containing grout component, 0 to about 88 percent by weight of a particulate inert solid filler consisting of 0 to about 50 percent by weight of said coarse filler component, and the remainder of said fine filler component; the content of particles larger than about 3.2 mm in all coarse filler components in said product being in the range of 0 to about 10 percent of that component by weight.

17. A grouting product of claim 16 wherein said hardenable resin composition is a resin formulation (R) comprising an unsaturated polymerizable polyester resin mixed with a monomeric polymerizable ethylenic crosslinking agent therefor, a polymerization inhibitor, and a promoter for a peroxide catalyst, and said catalyst composition is a catalyst formulation (C) containing a peroxide, the R/C weight ratio being at least about 1.5.

18. A grouting product of claim 17 wherein at least about 50 percent by weight of the total amount of filler present in said product is present in said resin formulation.

19. A grouting product of claim 17 wherein 100 percent of the filler present in said catalyst formulation is comprised of particles in a size range whose maximum is below about 1.0 mm.

20. A grouting product of claim 19 wherein said coarse filler component in said resin formulation constitutes about from 10 to 40 percent of the filler therein by weight.

21. A grouting product of claim 17 wherein all of the filler in said two grout components is limestone, sand, or a combination of limestone and sand.

22. A grouting product of claim 17 wherein all of the filler in said two grout components consists of limestone.

23. A grouting product of claim 17 wherein all of the coarse component in said product is sand.

24. In a two-component reactive grouting product comprising a filler-containing hardenable resin composition in one of said components and a catalyst composition in the other, said product being adapted to be placed with its two grout components in a separated condition in a hole in a structure to be reinforced, and to have a reinforcing member inserted and rotated therein so as to mix said components and allow ingredients therein to react and produce an annular layer of hardened resin grout that bonds said reinforcing member to the hole wall, the improvement comprising
 (a) in said resin-containing grout component, about from 78 to 88 percent by weight of a particulate inert solid filler consisting of about from 5 to 50 percent by weight of a coarse filler component comprised of particles in the size range of about from 2.0 to 9.6 mm, and the remainder of a fine filler component comprised of particles in a size range whose maximum is below about 2.0 mm; and
 (b) in said catalyst-containing grout component, 0 to about 88 percent by weight of a particulate inert solid filler consisting of 0 to about 50 percent by weight of said coarse filler component, and the remainder of said fine filler component; the content of particles larger than about 6.4 mm in all coarse filler components in said product being in the range of 0 to about 10 percent of that component by weight.

25. A grouting product of claim 24 wherein said hardenable resin composition is a resin formulation (R) comprising an unsaturated polymerizable polyester resin mixed with a monomeric polymerizable ethylenic crosslinking agent therefor, a polymerization inhibitor, and a promoter for a peroxide catalyst, and said catalyst composition is a catalyst formulation (C) containing a peroxide, the R/C weight ratio being at least about 1.5.

26. A grouting product of claim 25 wherein at least about 50 percent by weight of the total amount of filler present in said product is present in said resin formulation.

27. A grouting product of claim 25 wherein 100 percent of the filler present in said catalyst formulation is comprised of particles in a size range whose maximum is below about 2.0 mm.

28. A grouting product of claim 27 wherein said coarse filler component in said resin formulation constitutes about from 10 to 40 percent of the filler therein by weight.

29. A grouting product of claim 25 wherein all of the filler in said two grout components is limestone, sand, or a combination of limestone and sand.

30. A grouting product of claim 25 wherein all of the filler in said two grout components consists of limestone.

31. A grouting product of claim 25 wherein all of the coarse component in said product is sand.

* * * * *